United States Patent Office 2,917,435
Patented Dec. 15, 1959

2,917,435

PREPARATION OF 2-KETO-1-GULONIC ACID BY PSEUDOMONAS AERUGINOSA

David Perlman, Princeton, N.J., assignor to Olin Mathieson Chemical Corporation, New York, N.Y., a corporation of Virginia No Drawing. Application September 27, 1956
Serial No. 612,360

2 Claims. (Cl. 195—30)

This invention is concerned with the preparation of 2-keto-l-gulonic acid, an intermediate in the synthesis of ascorbic acid. More specifically, it is concerned with the preparation of this compound by subjecting a water-soluble l-gulonate to the oxidizing system produced by *Pseudomonas aeruginosa* when grown under aerobic conditions on sterile nutrient medium.

The organism *Pseudomonas aeruginosa* is described in Bergey's Manual of Determinative Bacteriology, 6th edition. Its cultural characteristics and standard test results are there described. A living culture of this organism may be obtained from the culture collection of the Fermentation Division, Northern Utilization Research Branch, U.S. Department of Agriculture, Peoria, Illinois, where it is identified as number NRRL B–23.

The preparation of 2-keto-l-gulonic acid by subjecting the l-gulonate to the oxidizing system produced by *Pseudomonas aeruginosa* may be carried out in any of several ways. For example, the organism may be grown under aerobic conditions on an otherwise sterile nutrient medium containing the gulonate. Alternatively, the l-gulonate may be added to such a medium in which growth has been established. The conversion may also be carried out by subjecting the l-gulonate to the action of a suspension of cells so grown, or of a cell-free broth in which the organism has been grown. The organism may also be grown on an otherwise sterile, solid or semi-solid nutrient medium, an extract of which may be used to carry out the conversion. All of these alternatives are included in the expression "subjecting to the oxidizing system produced by cultivating *Pseudomonas aeruginosa* under aerobic conditions on an otherwise sterile nutrient medium."

The organism *Pseudomonas aeruginosa* may readily be grown on standard nutrient media used for the cultivation and study of bacteria, of which examples are given in the aforementioned Bergey's Manual. For the purpose of preparing 2-keto-l-gulonic acid, however, it is necessary that the organism be grown on a nutrient medium which contains some water-soluble l-gulonate. To illustrate, a liquid nutrient medium containing a source of carbohydrate such as dextrose, or glycerol inorganic salts such as potassium phosphate and magnesium sulfate, a protein source such as peptone, growth promoting substances such as yeast extract, and l-gulonic lactone may be used. After the organism has become acclimated to the medium, it is not necessary to include an accessory carbohydrate source such as the dextrose used in the above illustration.

Among the utilizable water-soluble l-gulonates are l-gulonic acid, salts thereof such as the sodium, ammonium calcium salts, and (preferably) l-gulonic lactone.

When the organism has become established and adapted to the medium which contains no accessory carbohydrate source, it may be transferred into another such medium containing a water-soluble l-gulonate without loss of the ability to produce 2-keto-l-gulonic acid. Growth of the organism on a medium containing l-gulonic lactone tends to facilitate the propagation of a strain having the desired characteristics.

A method of carrying out the preparation of 2-keto-l-gulonic acid is illustrated by the following outline of such a procedure. A liquid nutrient medium containing inorganic salts and a source of nitrogen is charged with l-gulonic lactone and sterilized by autoclaving. This medium is then inoculated with a liquid, l-gulonic lactone containing broth in which the *Pseudomonas aeruginosa* has been growing for about 48 hours.

The mixture is shaken under aerobic conditions at a temperature of between 25° and 35° C. The size of the inoculum determines the time necessary to carry out the reaction. If the inoculum is about 1% of the total volume, about 5 days will be required. If, on the other hand, the inoculum is about 20% of the total volume, about one to three days will be required.

It has been found that the progress of the reaction may be followed by means of a color test using orthophenylenediamide dihydrochloride. This reagent is considered to be specific for 2-keto-hexonic acids under the following conditions: (Lanning and Cohn, J. Biol. Chem. 189, 109 (1951)), it is used in a 2½% aqueous solution; a sample of the reaction mixture is diluted so that it contains from between 25 to 100 gamma of product per milliliter; a sample of this solution is then treated with the orthophenylenediamine dihydrochloride reagent, the reagent volume being about ½ that of the sample; the mixture is then heated on a water bath for one-half hour; and after cooling, the mixture is placed in a Beckman spectrometer, and readings are made at 330 mµ. A straight line relationship exists between the concentration of 2-keto-l-gulonic acid and the optical density of the sample line at this wave length.

The following example is illustrative of the invention:

An aqueous nutrient medium is made up with the following composition:

| | G. |
|---|---|
| Cornsteep liquor | 10 |
| $CaCO_3$ | 10 |
| l-Gulonic lactone | 20 |
| $NH_4H_2PO_4$ | 5 |
| Glycerol | 5 |

Distilled water to 1000 ml.

This medium is inoculated with a culture of *Pseudomonas aeruginosa* (NRRL B–23). After about 48 hours, the vegetative culture is used to inoculate a similar nutrient medium from which the glycerol has been omitted, by adding 2 ml. of the culture to each of a series of 250 ml. Erlenmeyer flasks which have been charged with 25 ml. medium, plugged with non-absorbent cotton and autoclaved for 30 minutes. The fermentation flasks were placed on a reciprocating shaker (2 inch stroke, 98 cycles per min.) located in a constant temperature room maintained at 30°±1° C. One of the series of replicate flasks is removed for analysis periodically. At the end of 8 days incubation, approximately 44% of the gulonic lactone has been converted to 2-keto-l-gulonic acid. The 2-keto-l-gulonic acid is then isolated by the following procedure:

The cells are removed from the (pooled) fermentation medium by filtration through a bed of filter aid (e.g. Celite). The pH of the filtrate is then adjusted to about 7.5 by the addition of NaOH. To this is added methyl alcohol (or ethyl alcohol) until there is approximately a 75% alcoholic concentration. This causes a precipitate of calcium 2-keto-l-gulonate which is removed by filtration. Approximately 10 grams of the precipitate is suspended in 100 ml. of water and the required amount of 12 N sulfuric acid added to neutralize the calcium present and adjust the pH to approximately 2.5. The precipitated calcium sulfate is removed by filtration and the aqueous filtrate concentrated in vacuo to about 20 ml. An equal volume of ethanol is then added and the 2-keto-l-gulonic acid allowed to crystallize at 5° C. The melting point of the crystals formed is approximately 171° C.

The invention may be otherwise variously embodied within the scope of the appended claims.

I claim:

1. A process for preparing 2-keto-l-gulonic acid, which process comprises subjecting a water-soluble l-gulonate to the oxidizing system produced by cultivating *Pseudomonas aeruginosa* under aerobic conditions on an otherwise sterile, nutrient medium.

2. A process for preparing 2-keto-l-gulonic acid, which process comprises subjecting l-gulonic lactone to submerged aerobic fermentation with the organism *Pseudomonas aeruginosa*.

References Cited in the file of this patent

UNITED STATES PATENTS

| | | |
|---|---|---|
| 2,277,716 | Lockwood et al. | Mar. 31, 1942 |
| 2,421,611 | Gray | June 3, 1947 |
| 2,421,612 | Gray | June 3, 1947 |

OTHER REFERENCES

"Industrial Fermentations," by Underkofler et al., 1954, published by Chemical Publ. Co. Inc. (New York), pp. 1 to 21 (pp. 1 to 3, 7, 13 to 15 and 21 relied upon).